US 10,468,951 B2

(12) United States Patent
Kimura et al.

(10) Patent No.: US 10,468,951 B2
(45) Date of Patent: Nov. 5, 2019

(54) STATOR HEATING APPARATUS AND STATOR HEATING METHOD

(71) Applicant: AISIN AW CO., LTD., Anjo-shi, Aichi-ken (JP)

(72) Inventors: Hideaki Kimura, Okazaki (JP); Tsuyoshi Niwa, Anjo (JP); Takamitsu Sugimoto, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 654 days.

(21) Appl. No.: 14/902,275

(22) PCT Filed: Jul. 30, 2014

(86) PCT No.: PCT/JP2014/070008
 § 371 (c)(1),
 (2) Date: Dec. 30, 2015

(87) PCT Pub. No.: WO2015/016239
 PCT Pub. Date: Feb. 5, 2015

(65) Prior Publication Data
 US 2016/0254734 A1  Sep. 1, 2016

(30) Foreign Application Priority Data

Aug. 2, 2013 (JP) .................................. 2013-161816

(51) Int. Cl.
 *H02K 15/12*  (2006.01)
(52) U.S. Cl.
 CPC .................................... *H02K 15/12* (2013.01)
(58) Field of Classification Search
 CPC ......... Y10T 29/49009; Y10T 29/49078; Y10T 29/49012; H02K 15/12

(Continued)

(56) References Cited

U.S. PATENT DOCUMENTS 2,183,404 A * 12/1939 Morrill .................. H02K 19/08
 310/163
3,527,662 A *  9/1970 Elsworth ............... H02K 15/12
 427/8

(Continued)

FOREIGN PATENT DOCUMENTS

JP  S58-163252 A  9/1983
JP  H07-274452 A  10/1995

(Continued)

OTHER PUBLICATIONS

Oct. 28, 2014 Search Report issued in International Patent Application No. PCT/JP2014/070008.

*Primary Examiner* — Peter Dungba Vo
*Assistant Examiner* — Kaying Kue
(74) *Attorney, Agent, or Firm* — Oliff PLC

(57) ABSTRACT

A stator heating apparatus that includes a support that supports a stator in which a stator coil is mounted to a stator core and that is driven by a rotary to rotate the stator; a first heater that includes an induction coil inserted into a cavity portion provided at an axial center of the stator core of the stator supported by the support to be disposed to heat the stator through induction heating, the first heater heating the stator from a radially inner side of the stator; and a second heater that includes a hot-air outlet port that blows hot air toward an outer surface of a coil end portion of the stator supported by the support to heat the stator using the hot air, the second heater heating the stator from a side of the outer surface of the coil end portion, wherein the stator is heated by the first heater and the second heater.

16 Claims, 8 Drawing Sheets

(58) Field of Classification Search
USPC .......................................... 29/596, 598, 732
See application file for complete search history.

(56) References Cited

U.S. PATENT DOCUMENTS

| | | | | |
|---|---|---|---|---|
| 3,874,073 | A * | 4/1975 | Dochterman | H02K 3/32 29/598 |
| 4,559,698 | A * | 12/1985 | Bair | H02K 15/12 29/596 |
| 6,875,003 | B2 * | 4/2005 | Aono | H02K 1/2733 425/116 |
| 6,960,845 | B2 * | 11/2005 | Koide | G03B 27/58 250/491.1 |
| 7,279,859 | B2 * | 10/2007 | Hill | H02K 29/08 318/400.01 |
| 2010/0320194 | A1 * | 12/2010 | Koide | H02K 15/12 219/635 |
| 2011/0061228 | A1 | 3/2011 | Umino et al. | |
| 2012/0032551 | A1 | 2/2012 | Yoneda et al. | |

FOREIGN PATENT DOCUMENTS

| | | |
|---|---|---|
| JP | H09-181440 A | 7/1997 |
| JP | 2002-218718 A | 8/2002 |
| JP | 2005-086951 A | 3/2005 |
| JP | 2006-006054 A | 1/2006 |
| JP | 2007-097238 A | 4/2007 |
| JP | 2007-166712 A | 6/2007 |
| JP | 2008-072825 A | 3/2008 |
| JP | 2008-092733 A | 4/2008 |
| JP | 2008-193875 A | 8/2008 |
| JP | 2010-262828 A | 11/2010 |
| JP | 2011-097790 A | 5/2011 |
| JP | 2013-094056 A | 5/2013 |
| JP | 5297452 B2 | 9/2013 |

* cited by examiner

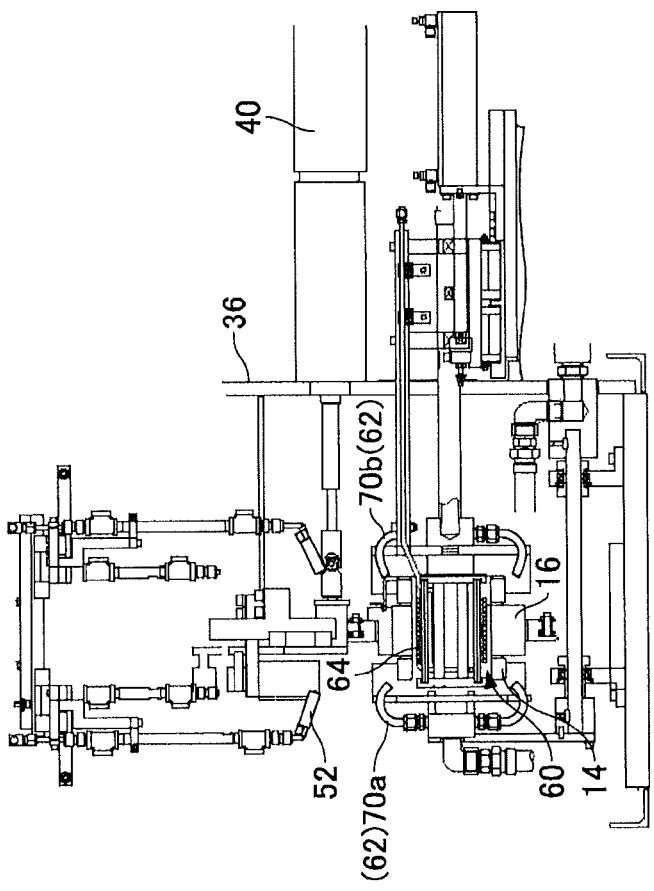
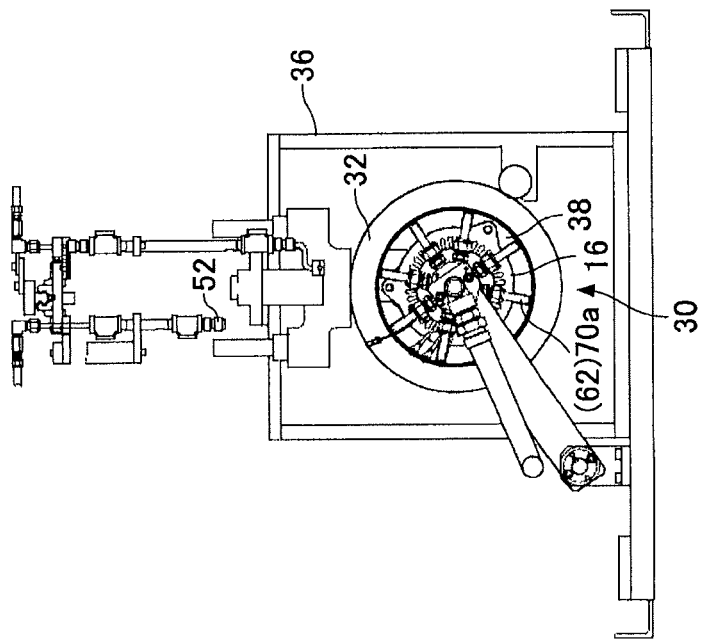

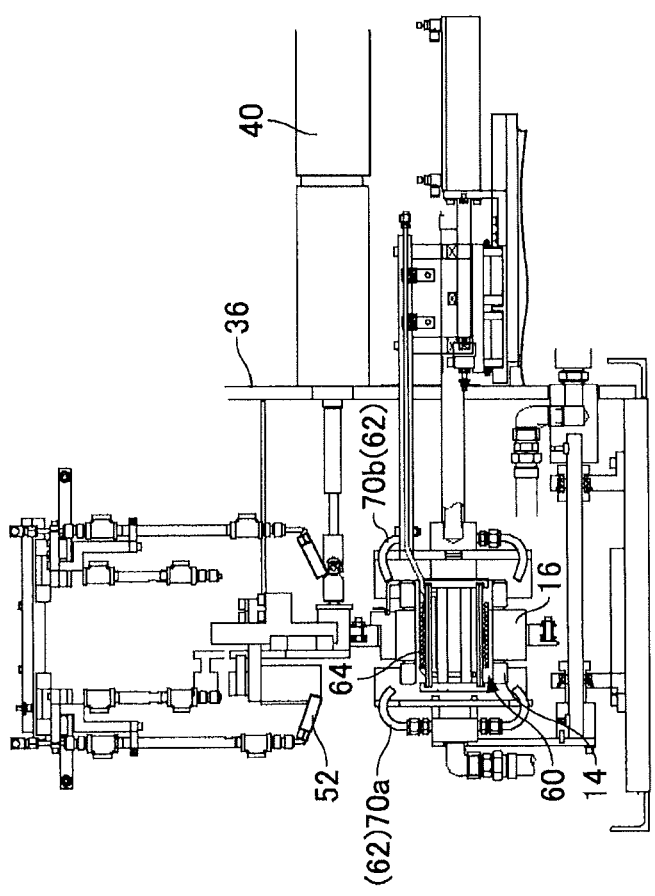
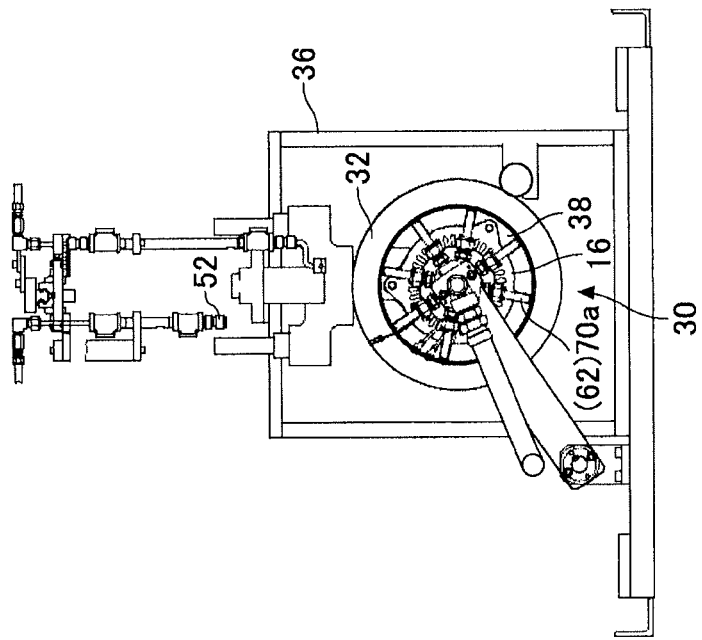

STATOR HEATING APPARATUS AND STATOR HEATING METHOD

BACKGROUND

The present disclosure relates to a stator heating apparatus and a stator heating method, and in particular to a stator heating apparatus and a stator heating method that are suitable to heat a stator in which a stator coil is mounted to a stator core.

There have hitherto been known a stator heating apparatus and a stator heating method for heating a stator in preparation for impregnating a stator coil mounted to a stator core with varnish (see Japanese Patent Application Publication No. 2007-166712, for example). The stator heating apparatus described in Japanese Patent Application Publication No. 2007-166712 includes a support mechanism that rotatably supports a stator in which a stator coil is mounted to a stator core, and a heating device that heats the stator supported by the support mechanism.

The support mechanism described above includes a workpiece rotary shaft inserted into a cavity portion provided at the axial center of the stator core. The workpiece rotary shaft is used to support the stator on the radially inner side of the stator, and to rotate the stator through rotation of the workpiece rotary shaft. In addition, the heating device described above feeds hot air toward the stator supported by the support mechanism. The heating device preliminarily heats the stator in order to reduce the viscosity of the varnish to be dropped before the varnish is dropped onto the coil end portion of the stator, and heats the dropped varnish to cure the vanish after the varnish is dropped onto the coil end portion of the stator.

SUMMARY

In the stator heating apparatus described in Japanese Patent Application Publication No. 2007-166712, as described above, the heating device heats the stator using hot air from the radially outer side or the axially outer side with the stator supported by the support mechanism. That is, the stator supported by the support mechanism is heated using hot air from the heating device. If the stator is heated using hot air, however, the surface of the stator is easily heated, but a coil housed in a slot between teeth formed on the inner peripheral surface of the stator core is not easily heated. As a result, the stator may not be heated efficiently or effectively, and the heating time may be prolonged.

The present disclosure has been made in view of the foregoing issues, and according to an exemplary aspect provides a stator heating apparatus and a stator heating method capable of efficiently and effectively heating a stator in which a stator coil is mounted to a stator core.

A stator heating apparatus according to an exemplary aspect includes a support that supports a stator in which a stator coil is mounted to a stator core and that is driven by a rotary to rotate the stator; a first heater that includes an induction coil inserted into a cavity portion provided at an axial center of the stator core of the stator supported by the support to be disposed to heat the stator through induction heating, the first heater heating the stator from a radially inner side of the stator; and a second heater that includes a hot-air outlet port that blows hot air toward an outer surface of a coil end portion of the stator supported by the support to heat the stator using the hot air, the second heater heating the stator from a side of the outer surface of the coil end portion, wherein the stator is heated by the first heater and the second heater.

A stator heating method according to an exemplary aspect includes the steps of heating a stator, in which a stator coil is mounted to a stator core, from a radially inner side of the stator using a first heater, the stator being supported by a support and rotated by drive of the support by a rotary, and the first heater including an induction coil inserted into a cavity portion provided at an axial center of the stator core to be disposed to heat the stator through induction heating; and heating the stator from a side of an outer surface of a coil end portion of the stator using a second heater, the second heater including a hot-air outlet port that blows hot air toward the outer surface of the coil end portion to heat the stator using the hot air.

According to the present disclosure, it is possible to efficiently and effectively heat a stator in which a stator coil is mounted to a stator core.

BRIEF DESCRIPTION OF THE DRAWINGS

FIG. 5 illustrates operation of the system according to the embodiment at the time of preliminarily heating the stator.

FIG. 7 illustrates operation of the system according to the embodiment at the time of heating the varnish dropped onto the coil end portions to cure the varnish.

DETAILED DESCRIPTION OF EMBODIMENTS

A stator heating apparatus and a stator heating method according to a specific embodiment of the present disclosure will be described below with reference to the drawings.

Figure 1:
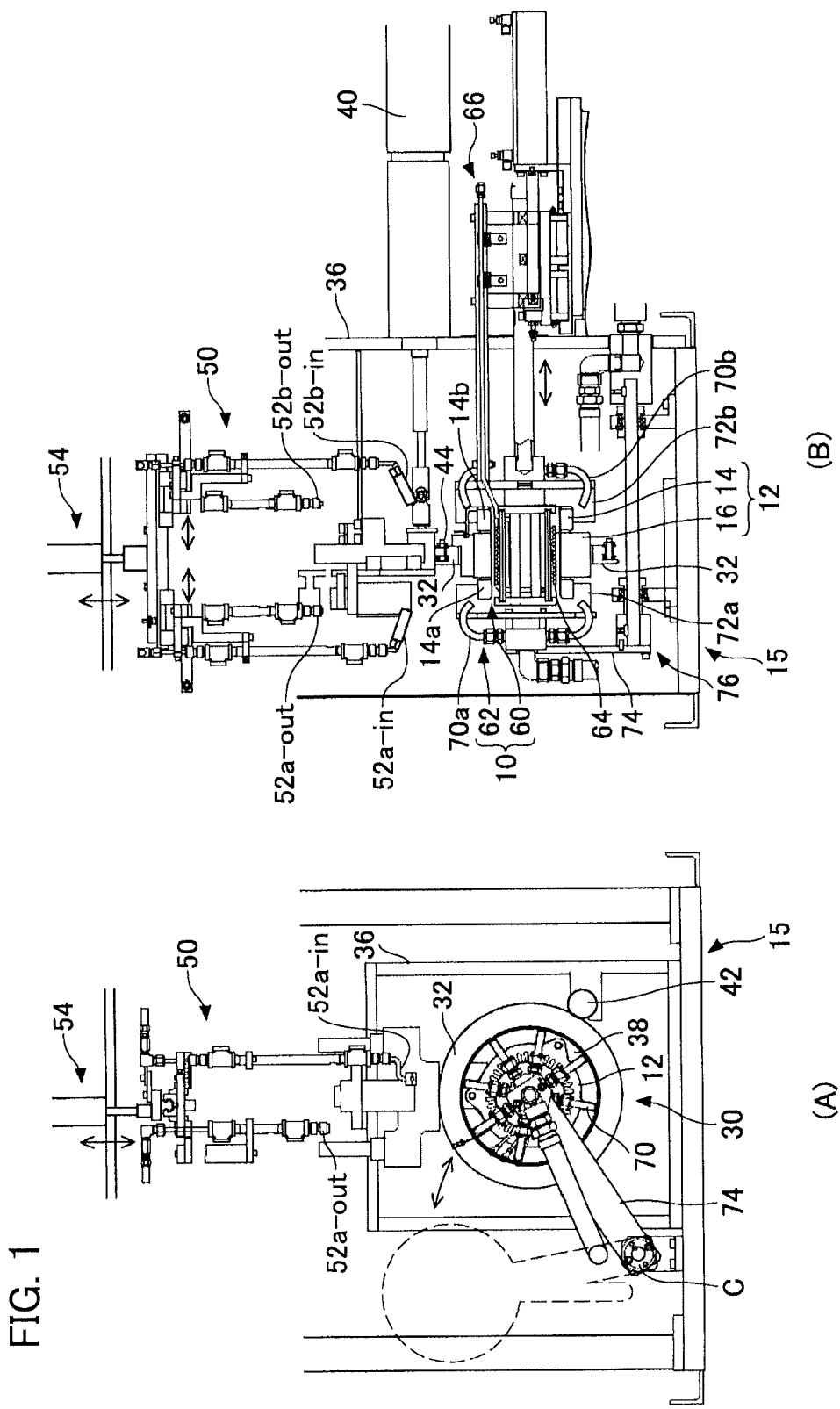
FIG. 1 illustrates the configuration of a system that includes a stator heating apparatus according to an embodiment of the present disclosure.
Figure 2:
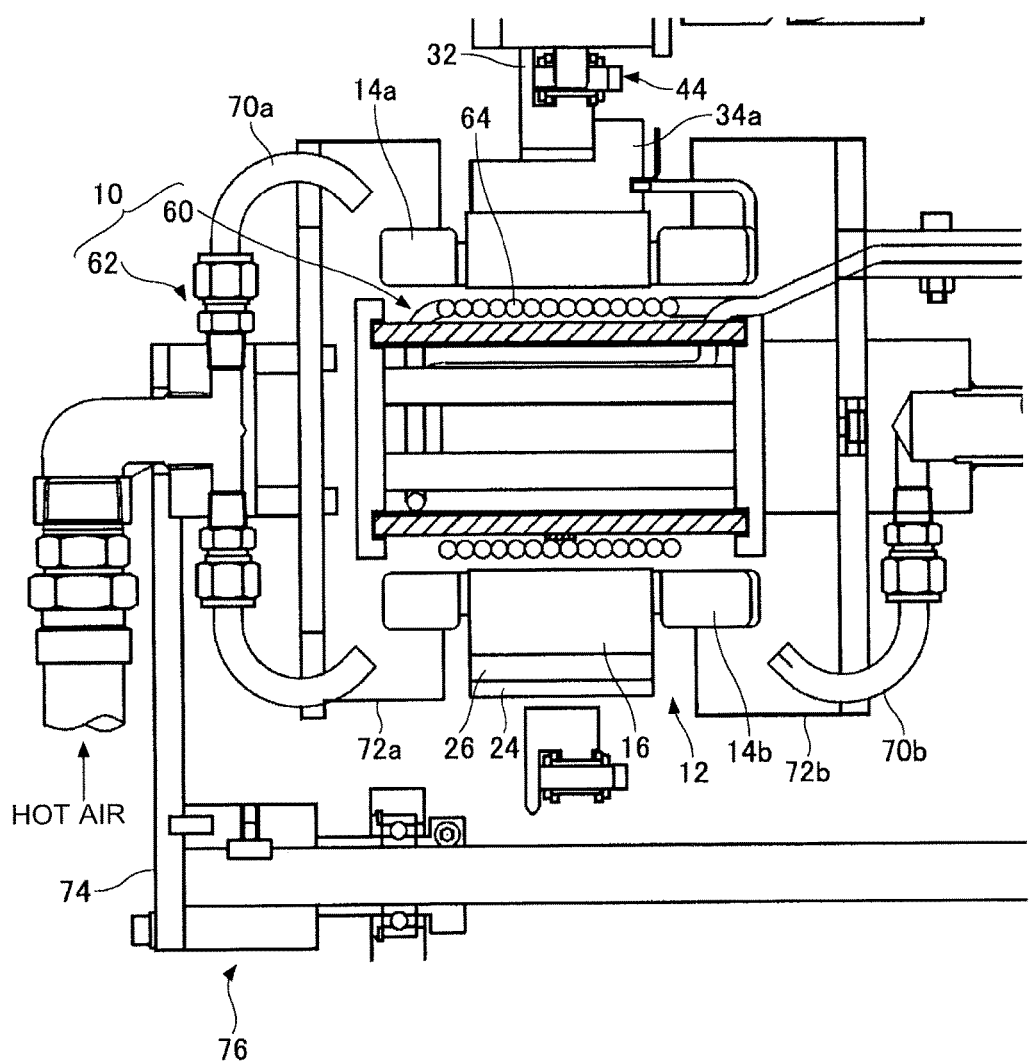
FIG. 2 is a sectional view illustrating an essential portion of the stator heating apparatus according to the embodiment.
Figure 3:
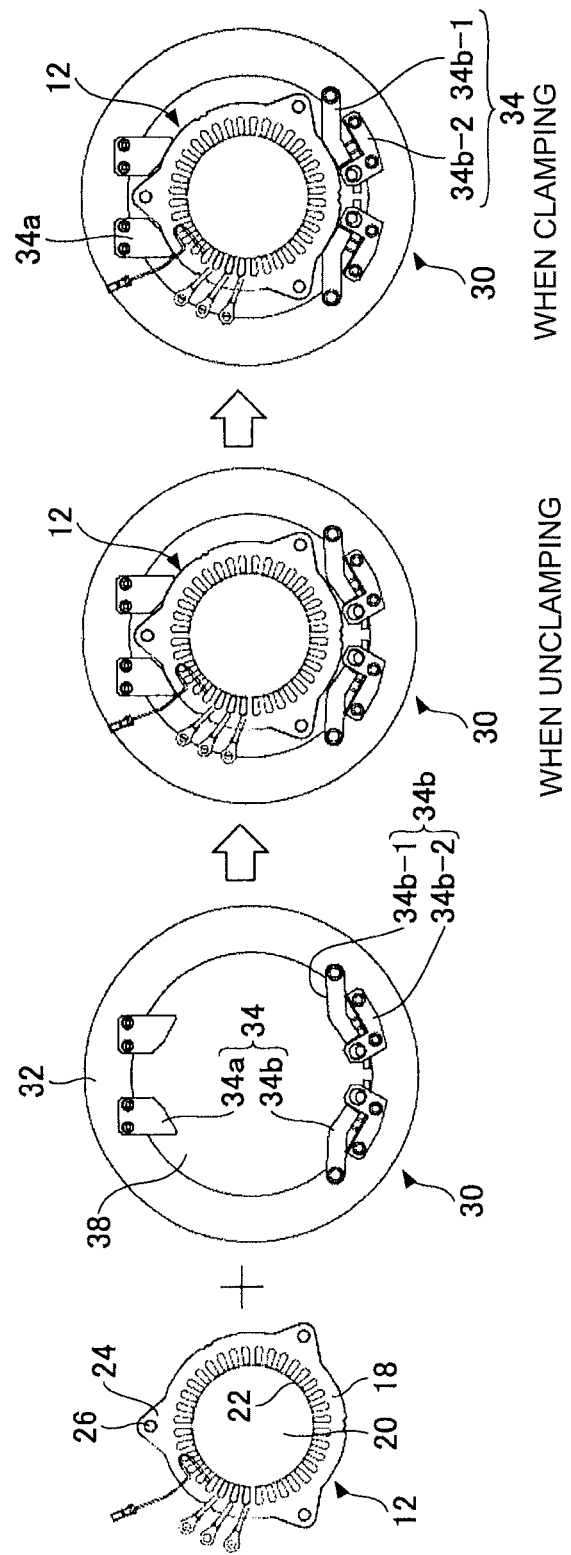
FIG. 3 illustrates the structure of a stator to be heated by the stator heating apparatus according to the embodiment and a support mechanism that supports the stator and a method of attaching the stator to the support mechanism.

FIG. 1 illustrates the configuration of a system that includes a stator heating apparatus 10 according to an embodiment of the present disclosure. FIG. 1A is a front view of the system. FIG. 1B is a side view (for some components, a sectional view) of the system. FIG. 2 is a sectional view illustrating an essential portion of the stator heating apparatus 10 according to the embodiment. FIG. 3 illustrates the structure of a stator to be heated by the stator heating apparatus 10 according to the embodiment and a support mechanism that supports the stator and a method of attaching the stator to the support mechanism.

The system which includes the stator heating apparatus 10 according to the embodiment is a varnish impregnation apparatus that impregnates a stator coil 14 of a stator 12 for use in a rotary electric machine, such as a three-phase AC motor, with varnish, for example. Hereinafter, the system according to the embodiment will be referred to as a "varnish impregnation apparatus 15". The varnish is used to secure the electrical insulation, earthquake resistance, oil resistance, chemical resistance, and heat radiation performance of the stator coil 14. The stator 12 is a stationary element disposed opposite to a rotor that serves as a rotary element via a predetermined air gap on the radially outer side of the rotor, and generates a magnetic field to rotate the rotor when the stator coil 14 is energized.

The stator 12 includes the stator coil 14 and a stator core 16. The stator core 16 is a member formed in a hollow cylindrical shape, and includes a yoke 18 formed in an annular shape, a cavity portion 20 formed in a columnar shape at the axial center, and teeth 22 that project toward the radially inner side (that is, toward the axial center) from the inner peripheral surface of the yoke 18. A plurality of teeth 22 are provided at equal intervals in the circumferential direction on the inner peripheral surface of the yoke 18. The stator core 16 is formed by stacking a plurality of magnetic steel sheets coated for insulation in the axial direction.

The stator core 16 includes fixation lug portions 24 that project in an angle shape toward the radially outer side from the outer peripheral surface of the yoke 18. The stator core 16 includes a plurality of (e.g. three) fixation lug portions 24 provided in the circumferential direction. The fixation lug portions 24 are provided with through holes 26 that penetrate in the axial direction. After being manufactured, the stator 12 is attached for fixation to a fixation target by inserting bolts into the through holes 26 of the fixation lug portions 24 of the stator core 16 and fastening the bolts to the fixation target.

The stator coil 14 is mounted to the stator core 16 described above. Specifically, the stator coil 14 is wound around the teeth 22 while being housed in a slot formed between two teeth 22 that are adjacent in the circumferential direction. The stator coil 14 is formed from metal, such as copper, that is electrically conductive and thermally conductive. The stator coil 14 includes coil end portions 14a and 14b that project toward both sides, in the axial direction, from the inside of the slot of the stator core 16. The coil end portion 14a projects toward one side in the axial direction from the stator core 16. Meanwhile, the coil end portion 14b projects toward the other side in the axial direction from the stator core 16.

In the case where the rotary electric machine is applied to a three-phase AC motor, for example, the stator coil 14 constitutes any of a U-phase coil, a V-phase coil, and a W-phase coil. In this case, the U-phase coil, the V-phase coil, and the W-phase coil as the stator coil 14 are wound around the teeth 22 in this order in the circumferential direction.

The stator heating apparatus 10 includes a support mechanism 30 (i.e., support) that supports the stator 12 in which the stator coil 14 is mounted to the stator core 16. The support mechanism 30 is a radially outer grasping ring that contacts the outer surface of the stator core 16 (specifically, the yoke 18) of the stator 12 to support the stator 12 on the radially outer side of the stator 12. Hereinafter, the support mechanism 30 will be referred to as a "radially outer grasping ring 30".

The radially outer grasping ring 30 is disposed between both end portions, in the axial direction, on the outer peripheral side of the stator core 16 of the stator 12 to be supported, and supports the stator 12 using a portion that projects toward the radially inner side (toward the axial center). The radially outer grasping ring 30 supports the stator 12 with the axial direction directed in the horizontal direction. The radially outer grasping ring 30 includes a ring portion 32 formed in an annular shape and a clamp portion 34 that supports the stator core 16.

The ring portion 32 is supported so as to be rotatable with respect to a frame 36 fixed to the ground surface. A cavity portion 38 in a columnar shape is formed at the axial center of the ring portion 32. The cavity portion 38 is formed with a size required to house the entire circumference of the stator core 16. Specifically, the diameter of the cavity portion 38, that is, the inside diameter of the ring portion 32, is set to be larger than the outside diameter of the stator core 16 including the fixation lug portions 24. The clamp portion 34 includes a projecting portion 34a that projects toward the radially inner side (toward the axial center) from the inner peripheral surface of the ring portion 32, and a chuck portion 34b, the position of which in the radial direction in the cavity portion 38 of the ring portion 32 is variable.

The projecting portion 34a has a role of clamping the fixation lug portion 24 of the stator core 16 from both sides in the circumferential direction to make the stator core 16, and hence the stator 12, unrotatable with respect to the ring portion 32. The projecting portion 34a is fixed to the ring portion 32. The projecting portion 34a is composed of a pair of projections so as to clamp the fixation lug portion 24 of the stator core 16 in the circumferential direction, and the two projections are formed at positions spaced in the circumferential direction of the ring portion 32 in an appropriate shape so as to match the shape of the fixation lug portion 24.

The chuck portion 34b has a role of facilitating attachment and detachment of the stator 12 to and from the radially outer grasping ring 30, and a role of supporting the stator 12 on the radially outer grasping ring 30. The chuck portion 34b includes a turning portion 34b-1 supported so as to be turnable with respect to the ring portion 32, and a fixed portion 34b-2 fixed to the ring portion 32. The turning portion 34b-1 is a member that extends in a curved bar shape. One end of the turning portion 34b-1 is supported on the ring portion 32 for fixation.

The turning portion 34b-1 is turnable about the one end fixed to the ring portion 32 between a clamping position (the position indicated as "WHEN CLAMPING" in FIG. 3), at which the other end of the turning portion 34b-1 is positioned relatively on the radially inner side in the cavity portion 38, and an unclamping position (the position indicated as "WHEN UNCLAMPING" in FIG. 3), at which the other end of the turning portion 34b-1 is positioned relatively on the radially outer side in the cavity portion 38. The fixed portion 34b-2 has a role of restricting the turning of the turning portion 34b-1 between the clamping position described above and the unclamping position described above.

The chuck portion 34b is provided at two locations in the circumferential direction of the ring portion 32. In each chuck portion 34b, at the clamping position described above, the distal end of the turning portion 34b-1 contacts the outer peripheral surface of the stator core 16 of the stator 12 housed in the cavity portion 38 of the ring portion 32 to support the stator 12. At the unclamping position described above, on the other hand, the contact between the distal end of the turning portion 34b-1 and the outer peripheral surface of the stator core 16 of the stator 12 housed in the cavity portion 38 of the ring portion 32 is canceled to cancel the support of the stator 12. The two chuck portions 34b provided as spaced in the circumferential direction of the ring portion 32 operate in synchronization with each other. The turning portions 34b-1 of the two chuck portions 34b provided as spaced in the circumferential direction of the ring portion 32 may be turned between the clamping position and the unclamping position by a spring force or the like.

The stator heating apparatus 10 also includes a rotary motor 40 (i.e., a rotary) that rotates the radially outer grasping ring 30, and a rotary support member 42 that supports the radially outer grasping ring 30. Both a housing of the rotary motor 40 and the rotary support member 42 are fixed to the frame 36. The rotary motor 40 is rotated in accordance with an electrical instruction from a controller mainly constituted of a microcomputer. The rotary support member 42 is provided at two locations below and on the outer peripheral side of the radially outer grasping ring 30. The rotary support member 42 is a member that supports the radially outer grasping ring 30 so as to be rotatable about the axial center. A rotary shaft of the rotary motor 40 is connected to the ring portion 32 of the radially outer grasping ring 30 via a bearing 44.

Rotation of the rotary motor 40 is transferred to the ring portion 32 of the radially outer grasping ring 30 via the bearing 44. The radially outer grasping ring 30 is rotated through rotation of the rotary motor 40 while being supported by the rotary support member 42. When the radially outer grasping ring 30 is rotated, the stator 12 supported by the radially outer grasping ring 30 is rotated about the axial center along with the rotation of the radially outer grasping ring 30. Thus, the stator 12 in which the stator coil 14 is mounted to the stator core 16 can be rotated through rotation of the rotary motor 40 while being supported by the radially outer grasping ring 30 on the radially outer side.

The varnish impregnation apparatus 15 according to the embodiment includes a varnish dropping device 50. The varnish dropping device 50 is a device that drops the varnish toward the coil end portions 14a and 14b of the stator 12 rotated by the rotary motor 40 while being supported by the radially outer grasping ring 30. The varnish dropping device 50 includes dropping nozzles 52 that communicate with a tank that stores the varnish. The varnish dropping device 50 pumps up the varnish in the tank using a pump or the like and supplies the varnish to the dropping nozzles 52 in accordance with an electrical instruction from the controller to drop the varnish from the dropping nozzles 52.

Two dropping nozzles 52 are provided for each of the coil end portions 14a and 14b at both ends, in the axial direction, of the stator 12. Specifically, the varnish dropping device 50 includes, as the dropping nozzles 52, a first radially outer dropping nozzle 52a-out and a first radially inner dropping nozzle 52a-in corresponding to the coil end portion 14a, and a second radially outer dropping nozzle 52b-out and a second radially inner dropping nozzle 52b-in corresponding to the coil end portion 14b.

The first radially outer dropping nozzle 52a-out is used to drop the varnish toward the radially outer side of the coil end portion 14a. The first radially inner dropping nozzle 52a-in is used to drop the varnish toward the radially inner side of the coil end portion 14a. The second radially outer dropping nozzle 52b-out is used to drop the varnish toward the radially outer side of the coil end portion 14b. The second radially inner dropping nozzle 52b-in is used to drop the varnish toward the radially inner side of the coil end portion 14b.

The respective dropping nozzles 52 can be moved by a movement mechanism 54 in the up-down direction and the horizontal direction (specifically, the axial direction of the supported stator 12) with respect to the frame 36. The movement mechanism 54 controls movement of the dropping nozzles 52 in accordance with an electrical instruction from the controller. The movement mechanism 54 can move the dropping nozzles 52 with respect to the frame 36 in the up-down direction and the horizontal direction to advance and retract the dropping nozzles 52 between the dropping position, at which the dropping nozzles 52 should be positioned when the varnish is dropped, and the retracted position, at which the dropping nozzles 52 should be positioned when the varnish is not dropped.

The dropping position of the first and second radially outer dropping nozzles 52a-out and 52b-out is a position that is suitable for the varnish dropped by the gravitational force from the distal ends of the nozzles to be dropped onto the radially outer side of the coil end portions 14a and 14b of the stator 12 supported by the radially outer grasping ring 30 in a region directly above the coil end portions 14a and 14b on the radially outer side of the coil end portions 14a and 14b.

In addition, the dropping position of the first and second radially inner dropping nozzles 52a-in and 52b-in is a position that is suitable for the varnish dropped by the gravitational force from the distal ends of the nozzles to be dropped onto the radially inner side of the coil end portions 14a and 14b of the stator 12 supported by the radially outer grasping ring 30 in a region above the bottom portion of the coil end portions 14a and 14b on the radially inner side (axial center side) of the coil end portions 14a and 14b.

Further, the retracted position of the dropping nozzles 52 is a position at which the distal ends of the nozzles are offset in the horizontal direction (specifically, toward the outer side in the axial direction) from a region above the coil end portions 14a and 14b of the stator 12 supported by the radially outer grasping ring 30, for example.

The first radially outer dropping nozzle 52a-out and the first radially inner dropping nozzle 52a-in used to drop the varnish onto the same coil end portion 14a may be moved in synchronization with each other by the integrated movement mechanism 54. In this case, for example, when moving the first radially outer dropping nozzle 52a-out and the first radially inner dropping nozzle 52a-in from the retracted position to the dropping position, the movement mechanism 54 descends the dropping nozzles 52a-out and 52a-in from the retracted position, and thereafter moves the dropping nozzles 52a-out and 52a-in toward the inner side in the axial direction (rightward in FIG. 1). When such movement is made, both the first radially outer dropping nozzle 52a-out and the first radially inner dropping nozzle 52a-in reach the dropping position. When moving the dropping nozzles 52a-out and 52a-in from the dropping position to the retracted position, the movement mechanism 54 moves the dropping nozzles 52a-out and 52a-in in the order opposite to the movement described above.

Similarly, the second radially outer dropping nozzle 52b-out and the second radially inner dropping nozzle 52b-in used to drop the varnish onto the same coil end portion 14b may be moved in synchronization with each other by the integrated movement mechanism 54. In this case, for example, when moving the second radially outer dropping nozzle 52b-out and the second radially inner dropping nozzle 52b-in from the retracted position to the dropping position, the movement mechanism 54 descends the dropping nozzles 52b-out and 52b-in from the retracted position, and thereafter moves the dropping nozzles 52b-out and 52b-in toward the inner side in the axial direction (leftward in FIG. 1). When such movement is made, both the second radially outer dropping nozzle 52b-out and the second radially inner dropping nozzle 52b-in reach the dropping position. When moving the dropping nozzles 52b-out and 52b-in from the dropping position to the retracted position, the movement mechanism 54 moves the dropping nozzles 52b-out and 52b-in in the order opposite to the movement described above.

The stator heating apparatus 10 also includes two types of heating devices 60 and 62 (i.e., first and second heaters) that heat the stator 12. The heating device 60 is a device that heats the stator 12 from the radially inner side of the stator 12. Meanwhile, the heating device 62 is a device that heats the stator 12 from the radially outer side and/or the axially outer side of the stator 12. Hereinafter, the heating device 60 will be referred to as a "first heating device 60", and the heating device 62 will be referred to as a "second heating device 62".

The first heating device 60 includes an induction coil 64 formed in a circular spiral shape. The induction coil 64 is disposed in the cavity portion 20 of the stator core 16 when heating the stator 12 such that the direction of extension of the circular spiral shape coincides with the axial direction of the stator 12. The outside diameter of the induction coil 64 is smaller than the diameter of the cavity portion 20. The induction coil 64 is electrically connected to the controller. A current that flows through the induction coil 64 is varied in accordance with an instruction from the controller when the induction coil 64 is inserted into the cavity portion 20, which generates an eddy current in the stator core 16 through electromagnetic induction to heat the stator 12 through induction heating (IH).

The first heating device 60 can be moved by a movement mechanism 66 in the horizontal direction (specifically, the axial direction of the supported stator 12) with respect to the frame 36. The movement mechanism 66 controls movement of the first heating device 60 in accordance with an electrical instruction from the controller. The movement mechanism 66 can move the first heating device 60 in the horizontal direction with respect to the frame 36 to advance and retract the induction coil 64 between a predetermined position (induction heating position) inside the cavity portion 20 of the supported stator 12 and a predetermined position (retracted position) outside the cavity portion 20. The induction coil 64 can heat the stator 12 through induction heating when positioned inside the cavity portion 20 of the supported stator 12. On the other hand, the induction coil 64 cannot heat the stator 12 through induction heating when positioned outside the cavity portion 20 of the supported stator 12.

The second heating device 62 includes hot-air nozzles 70 that communicate with a hot-air generator (not illustrated). The hot-air nozzles 70 are provided in correspondence with the coil end portions 14a and 14b at both ends, in the axial direction, of the stator 12. Specifically, the second heating device 62 includes, as the hot-air nozzles 70, hot-air nozzles 70a corresponding to the coil end portion 14a and used to blow hot air toward the periphery (outer surface) of the coil end portion 14a, and hot-air nozzles 70b corresponding to the coil end portion 14b and used to blow hot air toward the periphery (outer surface) of the coil end portion 14b. The second heating device 62 heats the stator 12 using hot air by feeding hot air generated in the hot air generator from hot-air outlet ports provided at the distal ends of the hot-air nozzles 70 toward the coil end portions 14a and 14b in accordance with an instruction from the controller.

The hot-air nozzles 70 are disposed in the vicinity of the coil end portions 14a and 14b when heating the stator 12. Specifically, the hot-air nozzles 70 are disposed such that the distal ends of the hot-air nozzles 70 are positioned on the radially outer side and the axially outer side of a corner portion between the radially outer end and the axially outer end of the coil end portions 14a and 14b. When heating the stator 12, the distal ends of the hot-air nozzles 70, that is, the hot-air outlet ports, are directed toward the corner portion between the radially outer end and the axially outer end of the coil end portions 14a and 14b.

A plurality of (e.g. eight) hot-air nozzles 70a are provided at equal intervals around the coil end portion 14a. Meanwhile, a plurality of (e.g. eight) hot-air nozzles 70b are provided at equal intervals around the coil end portion 14b. The plurality of hot-air nozzles 70a may communicate with the hot air generator described above via a branch point. In addition, the plurality of hot-air nozzles 70b may communicate with the hot air generator described above via a branch point.

A cover 72a is provided on the outer peripheral side of the hot-air nozzles 70a. The cover 72a is formed to surround all the hot-air nozzles 70a from the outer peripheral side, and formed so as to be able to cover the side of the outer surface of the coil end portion 14a when heating the stator 12. The cover 72a includes a cylindrical portion that covers the side of the radially outer surface of the coil end portion 14a, and an annular portion that covers the side of the axial end surface of the coil end portion 14a, and also includes a notched portion provided in the cylindrical portion such that the coil end portion 14a can be housed in the cylindrical portion.

All the hot-air nozzles 70a are configured to penetrate the axial end surface (annular portion) of the cover 72a in the axial direction and such that the distal ends of the hot-air nozzles 70a are directed toward the outer surface (specifically, the corner portion) of the coil end portion 14a on the inner side of a side surface (cylindrical portion) of the cover 72a. The cover 72a is disposed so as to cover the coil end portion 14a from the outer peripheral side and the axial side when heating the stator 12, and has a function of making it difficult for the hot air from the hot-air nozzles 70a to escape to the outside to facilitate heating of the stator 12 (in particular, the coil end portion 14a).

Similarly, a cover 72b is provided on the outer peripheral side of the hot-air nozzles 70b. The cover 72b is formed to surround all the hot-air nozzles 70b from the outer peripheral side, and formed so as to be able to cover the side of the outer surface of the coil end portion 14b when heating the stator 12. The cover 72b includes a cylindrical portion that covers the side of the radially outer surface of the coil end portion 14b, and an annular portion that covers the side of the axial end surface of the coil end portion 14b.

All the hot-air nozzles 70b are configured to penetrate the axial end surface (annular portion) of the cover 72b in the axial direction and such that the distal ends of the hot-air nozzles 70b are directed toward the outer surface (specifically, the corner portion) of the coil end portion 14b on the inner side of a side surface (cylindrical portion) of the cover 72b. The cover 72b is disposed so as to cover the coil end portion 14b from the outer peripheral side and the axial side when heating the stator 12, and has a function of making it difficult for the hot air from the hot-air nozzles 70b to escape to the outside to facilitate heating of the stator 12 (in particular, the coil end portion 14b).

The hot-air nozzles 70a of the second heating device 62 and the cover 72a are supported so as to be turnable and movable with respect to the frame 36 via a link portion 74. The hot-air nozzles 70a and the cover 72a are attached to one end of the link portion 74. The other end of the link portion 74 is supported on the frame 36 for fixation. The hot-air nozzles 70a, the cover 72a, and the link portion 74 can be turned about a support point C and moved in the horizontal direction (specifically, the axial direction of the supported stator 12) with respect to the frame 36 by a movement mechanism 76. The axial direction of the support point C is the same as the axial direction of the stator 12 supported by the radially outer grasping ring 30. The movement mechanism 76 controls movement of the hot-air nozzles 70a of the second heating device 62 in accordance with an electrical instruction from the controller.

The movement mechanism 76 can turn the link portion 74 and move the link portion 74 in the horizontal direction with respect to the frame 36 to advance and retract the hot-air nozzles 70a (including the hot-air outlet ports provided at the distal ends) between a hot air heating position, at which the hot-air nozzles 70a should be positioned when hot air is blown toward the outer surface of the coil end portion 14a, and a retracted position (the region indicated by the broken line in FIG. 1A), at which the hot-air nozzles 70a should be positioned when hot air is not blown. At the hot air heating position, the distal ends of all the hot-air nozzles 70a are positioned on the radially outer side and the axially outer side of a corner portion between the radially outer end and the axially outer end of the coil end portion 14a. Meanwhile, the retracted position is offset toward the radially outer side and the axially outer side with respect to the hot air heating position described above, for example.

When moving the hot-air nozzles 70a from the retracted position to the hot air heating position, for example, the movement mechanism 76 turns the link portion 74 from the retracted position, and thereafter moves the link portion 74 in the horizontal direction (rightward in FIG. 1). When such turn and movement is made, the hot-air nozzles 70a reach the hot air heating position. When moving the hot-air nozzles 70a from the hot air heating position to the retracted position, the movement mechanism 76 turns and moves the link portion 74 in the order opposite to the turn and the movement described above.

If the amount of movement, in the horizontal direction, of the link portion 74 by the movement mechanism 76 is small or no such movement is made, it is necessary to provide the notched portion in the cover 72a. If the amount of movement, in the horizontal direction, of the link portion 74 by the movement mechanism 76 is large or such movement is made, however, it is not necessary to provide the notched portion in the cover 72a. It should be noted, however, that with the notched portion, it is not necessary to move the hot-air nozzles 70a of the second heating device 62 and the cover 72a in the axial direction, and thus the width of the entire apparatus in the axial direction can be reduced.

The hot-air nozzles 70b of the second heating device 62 and the cover 72b are integrally attached to the first heating device 60 described above. The hot-air nozzles 70b and the cover 72b can be moved by the movement mechanism 66 described above in the horizontal direction (specifically, the axial direction of the supported stator 12) with respect to the frame 36 together with the first heating device 60. The movement mechanism 66 controls movement of the hot-air nozzles 70b of the second heating device 62 at the same time as controlling movement of the first heating device 60 in accordance with an electrical instruction from the controller.

The movement mechanism 66 can move the hot-air nozzles 70b of the second heating device 62 in the horizontal direction with respect to the frame 36 to advance and retract the hot-air nozzles 70b (including the hot-air outlet ports provided at the distal ends) between a hot air heating position, at which the hot-air nozzles 70b should be positioned when hot air is blown toward the outer surface of the coil end portion 14b, and a retracted position, at which the hot-air nozzles 70b should be positioned when hot air is not blown. At the hot air heating position, the distal ends of all the hot-air nozzles 70b are positioned on the radially outer side and axially outer side of a corner portion between the radially outer end and the axially outer end of the coil end portion 14b. Meanwhile, the retracted position is offset toward the radially outer side and the axially outer side with respect to the hot air heating position described above, for example.

When the hot-air nozzles 70 are positioned at the retracted position, hot air is not blown toward the coil end portions 14a and 14b, and thus the stator 12 is not heated. When the hot-air nozzles 70 are positioned at the hot air heating position, on the other hand, hot air from the hot-air nozzles 70 is blown toward the outer surface of the coil end portions 14a and 14b, and thus the stator 12 is heated.

The radially outer grasping ring 30, the varnish dropping device 50, the first and second heating devices 60 and 62, and the frame 36 of the varnish impregnation apparatus 15 are installed inside a single box body.

Figure 4A:
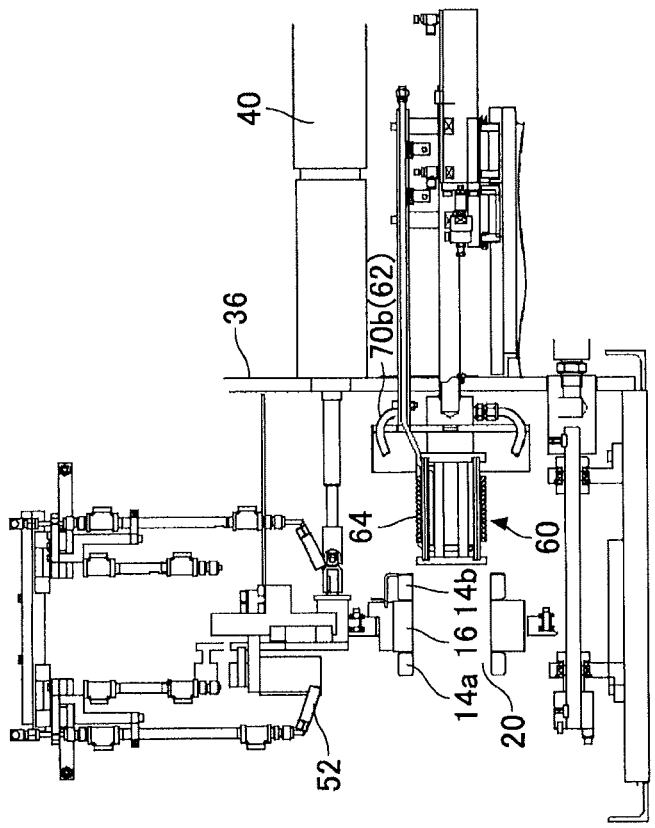
FIG. 4 illustrates operation of the system according to the embodiment at the time of attaching the stator.
Figure 4B:
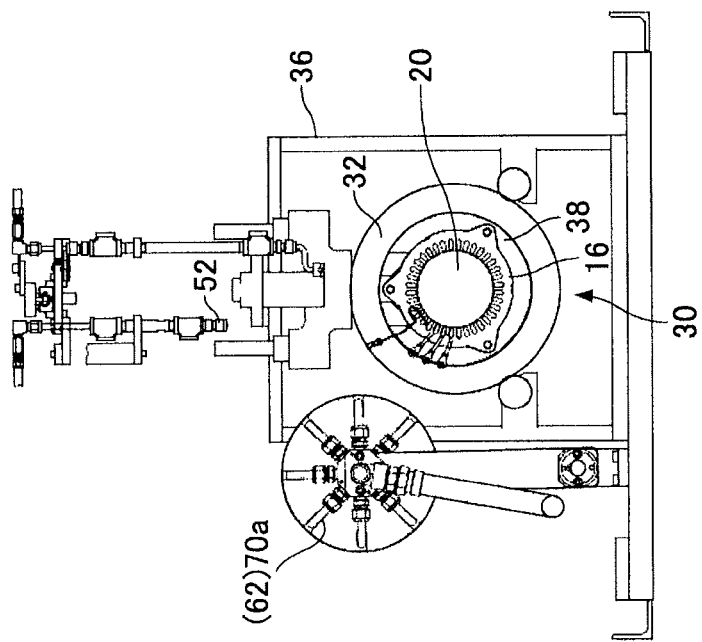
Figure 6A:
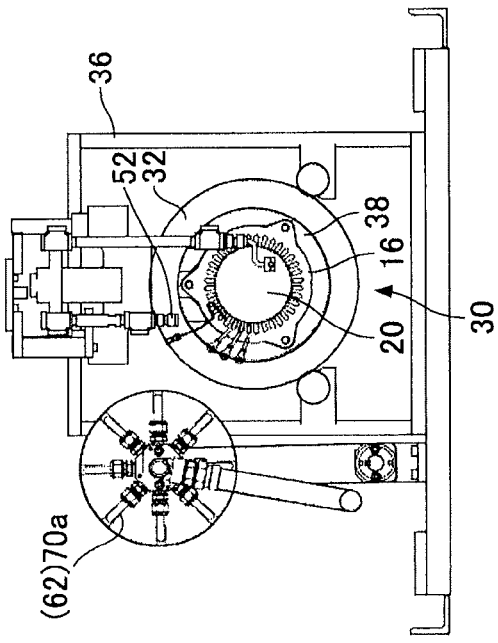
FIG. 6 illustrates operation of the system according to the embodiment at the time of dropping varnish onto coil end portions of the stator.
Figure 6B:
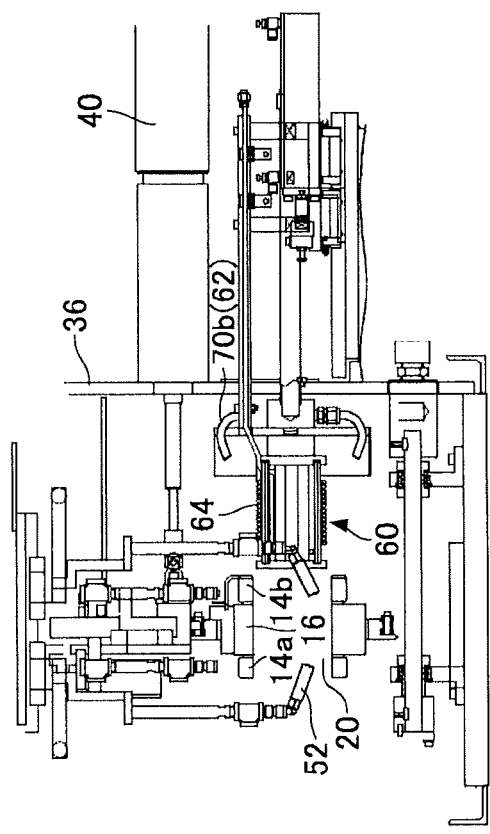

Next, a method in which the varnish impregnation apparatus 15 according to the embodiment impregnates the stator coil 14 with the varnish will be described with reference to FIGS. 4 to 7. FIG. 4 illustrates operation of the varnish impregnation apparatus 15 according to the embodiment at the time of attaching the stator 12. FIG. 5 illustrates operation of the varnish impregnation apparatus 15 according to the embodiment at the time of preliminarily heating the supported stator 12. FIG. 6 illustrates operation of the varnish impregnation apparatus 15 according to the embodiment at the time of dropping the varnish onto the coil end portions 14a and 14b of the supported stator 12. FIG. 7 illustrates operation of the varnish impregnation apparatus 15 according to the embodiment at the time of heating the varnish dropped onto the coil end portions 14a and 14b to cure the varnish. FIGS. 4A, 5A, 6A, and 7A are each a front view. FIGS. 4B, 5B, 6B, and 7B are each a side view (for some components, a sectional view).

In order to impregnate the stator coil 14 of the stator 12 with the varnish, the varnish impregnation apparatus 15 according to the embodiment performs (1) a stator attachment step in which the stator 12 is supported on the radially outer side by the radially outer grasping ring 30, (2) a preliminary heating step in which the supported stator 12 is preliminarily heated by the stator heating apparatus 10, (3) a varnish dropping step in which the varnish is dropped from the varnish dropping device 50 onto the coil end portions 14a and 14b of the preliminarily heated stator 12, and (4) a heating and curing step in which the varnish dropped onto the coil end portions 14a and 14b is heated and cured by the stator heating apparatus 10, the steps being performed in this order.

In the varnish impregnation apparatus 15, in the stator attachment step, first, as illustrated in FIG. 4, the respective dropping nozzles 52 of the varnish dropping device 50 are positioned at the retracted position by the movement mechanism 54, the first heating device 60 and the hot-air nozzles 70b of the second heating device 62 are positioned at the retracted position by the movement mechanism 66, and the hot-air nozzles 70a of the second heating device 62 are positioned at the retracted position by the movement mechanism 76. Then, with the turning portion 34b-1 of the chuck portion 34b of the radially outer grasping ring 30 turned to the unclamping position, the stator 12 as a workpiece is set to the radially outer grasping ring 30 from the axially outer side (the left side in FIG. 4B) such that the fixation lug portion 24 of the stator core 16 is clamped by the pair of projecting portions 34a in the circumferential direction, and thereafter the turning portion 34b-1 is turned to the clamping position.

When such a state is established, the stator 12 housed in the cavity portion 38 of the ring portion 32 of the radially outer grasping ring 30 is supported on the radially outer side of the stator 12 by the radially outer grasping ring 30 with the fixation lug portion 24 of the stator core 16 clamped by the pair of the projecting portions 34a in the circumferential direction and with the outer peripheral surface of the stator core 16 contacting the distal end of the turning portion 34b-1 to be supported.

When the stator 12 is supported on the radially outer side by the radially outer grasping ring 30 in the stator attachment step, the controller for the varnish impregnation apparatus 15 next performs the preliminary heating step. In the preliminary heating step, first, as illustrated in FIG. 5, with the respective dropping nozzles 52 of the varnish dropping device 50 kept positioned at the retracted position, the first heating device 60 and the hot-air nozzles 70b of the second heating device 62 are moved to the induction heating position or the hot air heating position by the movement mechanism 66, the hot-air nozzles 70a of the second heating device 62 are moved to the hot air heating position by the movement mechanism 76, and the rotary motor 40 is rotated.

When such movement is made, the induction coil 64 of the first heating device 60 is inserted into the cavity portion 20 of the stator 12 supported by the radially outer grasping ring 30, and the hot-air nozzles 70 of the second heating device 62 are disposed, on the outer peripheral side of the coil end portions 14a and 14b of the stator 12 (specifically, on the radially outer side and the axially outer side with respect to the corner portion between the radially outer end and the axially outer end of the coil end portions 14a and 14b), with the distal ends of the hot-air nozzles 70 directed toward the corner portion of the coil end portions 14a and 14b. When the rotary motor 40 is rotated, meanwhile, the radially outer grasping ring 30 supporting the stator 12 is rotated with respect to the frame 36 while being supported by the rotary support member 42, and thus the stator 12 is also rotated with respect to the frame 36.

Then, in the preliminary heating step, next, a current is supplied to the induction coil 64 of the first heating device 60, and the hot air generator of the second heating device 62 is actuated. When such a state is established, the stator 12 supported by the radially outer grasping ring 30 is heated by the induction coil 64 through induction heating, and the stator 12 (mainly the coil end portions 14a and 14b) is heated using hot air, with hot air from the hot-air outlet ports of the hot-air nozzles 70 directly blown to the outer surface (specifically, the corner portion) of the coil end portions 14a and 14b or with the temperature of the spaces in the covers 72a and 72b raised by the hot air from the hot-air outlet ports of the hot-air nozzles 70. In the preliminary heating step, it is effective, in heating the stator 12 efficiently and effectively, to perform induction heating by the induction coil 64 and hot-air heating by the hot-air nozzles 70 at the same time or generally at the same timing.

The electrical resistance of the stator core 16 is higher than the electrical resistance of the stator coil 14. Therefore, the temperature of the stator core 16 tends to be higher than the temperature of the stator coil 14. In particular, there is a remarkable difference in temperature between the stator core 16 and the stator coil 14 housed in the slot. Thus, in the case where the temperature of the stator core 16 reaches a temperature around a limit temperature after heating by the first and second heating devices 60 and 62 is started, induction heating by the induction coil 64 of the first heating device 60 may be stopped, or the output of such induction heating may be reduced, so that the stator coil 14 is thereafter heated utilizing a difference in temperature between the stator core 16 and the stator coil 14.

Even if induction heating by the first heating device 60 is stopped, or the output of such induction heating is reduced, the second heating device 62 may continue hot-air heating so that the coil end portions 14a and 14b are not cooled, thus heating the entire stator 12 to a uniform temperature.

With such a preliminary heating procedure, the stator coil 14 in the slot is heated utilizing a difference in temperature between the stator coil 14 in the slot and the stator core 16 around the slot after the stator core 16 is rapidly heated through induction heating by the induction coil 64. Thus, the stator coil 14 in the slot can be heated efficiently and immediately.

When the stator 12 described above is preliminarily heated, the viscosity of the varnish that adheres to the stator coil 14 can be reduced in the case where the varnish is thereafter dropped onto the stator coil 14 of the stator 12, as a result of which infiltration of the varnish into the stator coil 14 can be promoted.

When the stator 12 is preliminarily heated in the preliminary heating step, the controller of the varnish impregnation apparatus 15 next performs the varnish dropping step. In the varnish dropping step, first, as illustrated in FIG. 6, the first heating device 60 and the hot-air nozzles 70b of the second heating device 62 are moved to the retracted position by the movement mechanism 66, the hot-air nozzles 70a of the second heating device 62 are moved to the retracted position by the movement mechanism 76, and thereafter the respective dropping nozzles 52 of the varnish dropping device 50 are moved to the dropping position by the movement mechanism 54.

When such movement is made, the induction coil 64 of the first heating device 60 is retracted from the inside to the outside of the cavity portion 20 of the stator 12 supported by the radially outer grasping ring 30, the hot-air nozzles 70 of the second heating device 62 are retracted from the vicinity of the coil end portions 14a and 14b of the stator 12, and the respective dropping nozzles 52 are disposed at the dropping position above the coil end portions 14a and 14b.

Then, in the varnish dropping step, the pump or the like is next actuated to supply the varnish in the tank toward the dropping nozzles 52. When such a state is established, the varnish is dropped from the dropping nozzles 52 toward the coil end portions 14a and 14b of the stator 12 supported by the radially outer grasping ring 30. In this event, the stator 12 is rotated with respect to the frame 36 by rotation of the radially outer grasping ring 30, and thus the varnish is dropped equally over the entire circumference of the coil end portions 14a and 14b. In this event, in addition, the stator 12 has been preliminarily heated in the preliminary heating step, which facilitates infiltration of the varnish dropped onto the coil end portions 14a and 14b into the stator coil 14.

When the varnish is dropped onto the coil end portions 14a and 14b of the stator coil 14 in the varnish dropping step, the controller for the varnish impregnation apparatus 15 next performs the heating and curing step. In the heating and curing step, first, as illustrated in FIG. 7, the respective dropping nozzles 52 of the varnish dropping device 50 are moved to the retracted position by the movement mechanism 54, the first heating device 60 and the hot-air nozzles 70b of the second heating device 62 are thereafter moved to the induction heating position or the hot air heating position by the movement mechanism 66, and the hot-air nozzles 70a of the second heating device 62 are moved to the hot air heating position by the movement mechanism 76.

When such movement is made, the respective dropping nozzles 52 are retracted from the dropping position above the coil end portions 14a and 14b, the induction coil 64 of the first heating device 60 is inserted into the cavity portion 20 of the stator 12 supported by the radially outer grasping ring 30, and the hot-air nozzles 70 of the second heating device 62 are disposed, on the outer peripheral side of the coil end portions 14a and 14b of the stator 12 (specifically, on the radially outer side and the axially outer side with respect to the corner portion between the radially outer end and the axially outer end of the coil end portions 14a and 14b), with the hot-air outlet ports at the distal ends of the hot-air nozzles 70 directed toward the corner portion of the coil end portions 14a and 14b.

Then, in the heating and curing step, next, a current is supplied to the induction coil 64 of the first heating device 60, and the hot air generator of the second heating device 62 is actuated. When such a state is established, the stator 12 supported by the radially outer grasping ring 30 is heated by the induction coil 64 through induction heating, and the stator 12 (mainly the coil end portions 14a and 14b) is heated using hot air, with hot air from the hot-air outlet ports of the hot-air nozzles 70 directly blown to the outer surface (specifically, the corner portion) of the coil end portions 14a and 14b or with the temperature of the spaces in the covers 72a and 72b raised by the hot air from the hot-air outlet ports of the hot-air nozzles 70. In the heating and curing step, it is effective, in heating the stator 12 efficiently and effectively, to perform induction heating by the induction coil 64 and hot-air heating by the hot-air nozzles 70 at the same time or generally at the same timing.

The varnish which is infiltrated into the stator coil 14 is low in viscosity. Thus, the varnish is scattered away from the stator coil 14 if strong hot air is blown toward the varnish. Thus, the stator may be heated through only induction heating by the induction coil 64 of the first heating device 60 before the varnish infiltrated into the stator coil 14 is gelated to become higher in viscosity, and heating of the varnish infiltrated into the stator coil 14 may be promoted by blowing hot air to the outer surface of the coil end portions 14a and 14b through the hot-air nozzles 70a and 70b of the second heating device 62 after the varnish is gelated.

With such a heating procedure, the stator 12 is heated through induction heating by the induction coil 64 before the varnish infiltrated into the stator coil 14 is gelated, and the stator 12 is heated through hot-air heating by the hot-air nozzles 70a and 70b after the varnish is gelated. Thus, the stator 12 can be heated immediately without scattering away the varnish infiltrated into the stator coil 14.

When the stator 12 described above is heated, the varnish dropped onto the coil end portions 14a and 14b is heated to be cured.

When the varnish dropped onto the coil end portions 14a and 14b of the stator 12 is heated to be cured in the heating and curing step, next, the controller for the varnish impregnation apparatus 15 causes the movement mechanism 66 to move the first heating device 60 and the hot-air nozzles 70b of the second heating device 62 to the retracted position, and causes the movement mechanism 76 to move the hot-air nozzles 70a of the second heating device 62 to the retracted position. When such movement is made, the induction coil 64 of the first heating device 60 and the hot-air nozzles 70 of the second heating device 62 are retracted to the retracted position with the respective dropping nozzles 52 of the varnish dropping device 50 kept positioned at the retracted position.

Then, from such a situation, the turning portion 34b-1 of the chuck portion 34b of the radially outer grasping ring 30 is turned to the unclamping position. When such a state is established, the contact between the distal end of the turning portion 34b-1 and the outer peripheral surface of the stator core 16 of the stator 12 housed in the cavity portion 38 of the ring portion 32 of the radially outer grasping ring 30 is canceled, and thus the support of the stator 12 on the radially outer side is canceled. In this case, the stator 12 impregnated with the varnish can be taken out from the inside of the cavity portion 38 of the ring portion 32 of the radially outer grasping ring 30. The stator 12 is preferably taken out at a timing after the stator 12 is cooled.

Thus, in the varnish impregnation apparatus 15 according to the embodiment, the stator 12 can be supported on the radially outer side of the stator 12 by the radially outer grasping ring 30, whose ring portion 32 is supported so as to be rotatable with respect to the frame 36 fixed to the ground surface, while rotating the stator 12 through rotation of the rotary motor 40, the supported stator 12 can be preliminarily heated before the varnish is dropped, thereafter the varnish can be dropped onto the coil end portions 14a and 14b of the preliminarily heated stator 12, and then the varnish dropped onto the coil end portions 14a and 14b can be heated to be cured.

That is, a sequence of steps, namely the preliminary heating step, the varnish dropping step, and the heating and curing step, required to impregnate the stator coil 14 with the varnish can be performed with the stator 12 supported by the same radially outer grasping ring 30 while rotating the stator 12. In the sequence of steps, as appropriate, the dropping nozzles 52 of the varnish dropping device 50 are advanced and retracted by the movement mechanism 54, and the first heating device 60 and the second heating device 62 are advanced and retracted by the movement mechanisms 66 and 76, respectively. In this respect, according to the embodiment, all the steps, including varnish dropping and heating, for impregnating the stator coil 14 of the stator 12 with the varnish can be performed at the same location. Thus, it is not necessary to provide a conveyance mechanism that connects between the steps, which contributes to the simplification, space-saving, and cost reduction of the equipment.

In the stator heating apparatus 10 and the varnish impregnation apparatus 15 according to the embodiment, the stator 12 in which the cavity portion 20 is formed at the axial center is not supported on the cavity portion 20 side (radially inner side) but supported on the radially outer side by the radially outer grasping ring 30, and supported between both end surfaces, in the axial direction, of the stator core 16 (that is, between an end surface of the stator core 16 on one side in the axial direction and an end surface of the stator core 16 on the other side in the axial direction). In such a structure, it is not necessary to dispose a support member or a support mechanism in the cavity portion 20 on the radially inner side of the stator 12 in supporting the stator 12. In this respect, the induction coil 64 of the first heating device 60 can be inserted into the cavity portion 20 on the radially inner side of the stator core 16 to be disposed when heating the stator 12, which enables the stator 12 to be heated from the radially inner side of the stator 12.

The inner peripheral surface of the stator 12 (specifically, the distal end surfaces of the teeth 22) is formed in the shape of a surface having no projections or recesses and provided opposite to the outer peripheral surface of the rotor via a predetermined air gap. In addition, the induction coil 64 is disposed in the cavity portion 20 of the stator core 16 such that the direction of extension of the circular spiral shape coincides with the axial direction of the stator 12. In this respect, in inserting the induction coil 64 into the cavity portion 20 on the radially inner side of the stator core 16 to be disposed when heating the stator 12, the clearance formed in the radial direction between the induction coil 64 and the inner peripheral surface of the stator core 16 can be made uniform over the entire circumference and as narrow as possible.

Therefore, according to the embodiment, induction heating by the induction coil 64 can be performed efficiently and effectively compared to a configuration in which the stator 12 is heated through induction heating from the radially outer side of the stator 12, which includes the fixation lug portions 24 which project toward the radially outer side from the outer peripheral surface of the stator core 16 (i.e. the yoke 18). Thus, it is possible to shorten the heating time required for preliminary heating of the stator 12, and heating and softening of the varnish, or to reduce energy for heating the stator 12 to a desired temperature.

In the stator 12, the stator coil 14 is housed in the slot between the teeth 22 formed on the inner peripheral surface of the yoke 18 to project toward the axial center. In the case where the stator 12 having such a structure is heated through induction heating, heat generated in the stator core 16 is transferred to the stator coil 14 in the slot to heat the stator coil 14. In this respect, with the structure in which the stator 12 is heated through induction heating using the induction coil 64 from the radially inner side of the stator 12 as in the embodiment, the induction coil 64 and the stator core 16 are disposed in proximity to each other, and thus the stator coil 14 is easily heated.

Thus, according to the embodiment, the stator coil 14 can be heated efficiently and effectively compared to a configuration in which the stator 12 is heated through induction heating from the radially outer side. In addition, the stator coil 14 can be heated efficiently and effectively compared to a configuration in which the stator 12 is heated through only hot-air heating from the side of the outer surface of the stator 12.

During induction heating by the induction coil 64, heat on the stator core 16 side is first transferred to a portion of the stator coil 14 in the slot, and thereafter reaches the coil end portions 14a and 14b through the stator coil 14 itself, thus heating the entire stator coil 14. The coil end portions 14a and 14b of the stator coil 14, which project in the axial direction from both end portions, in the axial direction, of the stator core 16, are not housed in the slot of the stator core 16 but exposed to the outside air.

Thus, the heat having reached the coil end portions 14a and 14b is easily released to the outside air.

In order to address such an issue, the stator heating apparatus 10 according to the embodiment includes the second heating device 62 disposed on the outer peripheral side of the coil end portions 14a and 14b of the stator 12 when heating the stator 12. The second heating device 62 includes the hot-air nozzles 70 which blow hot air from the hot-air outlet ports at the distal ends to the outer surface (specifically, the corner portion between the radially outer end and the axially outer end) of the coil end portions 14a and 14b of the stator 12. In this respect, when heating the stator 12, the hot-air nozzles 70 of the second heating device 62 can be disposed on the outer peripheral side of the coil end portions 14a and 14b of the stator 12 to heat the coil end portions 14a and 14b using hot air. Thus, the stator 12 can be heated from the side of the periphery (outer surface) of the stator 12.

Therefore, according to the embodiment, heat transferred to the coil end portions 14a and 14b, which have been heated through induction heating of the stator 12 using the induction coil 64, can be prevented from being released to the outside air by hot-air heating of the stator 12 performed using the hot-air nozzles 70, and heating of the coil end portions 14a and 14b of the stator 12 can be promoted.

A plurality of above-described the hot-air nozzles 70 are provided in correspondence with the coil end portions 14a and 14b at both ends, in the axial direction, of the stator 12 at equal intervals around each of the coil end portions 14a and 14b. In this respect, uneven heating of the coil end portions 14a and 14b can be suppressed to uniformly heat the entire coil end portions 14a and 14b. Therefore, according to the embodiment, hot-air heating by the hot-air nozzles 70 can be performed efficiently and effectively. Thus, it is possible to shorten the heating time required for preliminary heating of the stator 12, and heating and softening of the varnish, or to reduce energy for heating the stator 12 to a desired temperature.

The second heating device 62 includes the cover 72 provided on the outer peripheral side of the hot-air nozzles 70 to surround the hot-air nozzles 70 from the outer peripheral side and to cover the coil end portions 14a and 14b from the side of the outer surface. In this respect, the presence of the cover 72 can make it difficult for the hot air from the hot-air nozzles 70b to escape to the outside when heating the stator 12. Therefore, according to the embodiment, hot-air heating of the stator 12 by the hot-air nozzles 70 can be performed efficiently and effectively. Thus, it is possible to shorten the heating time required for preliminary heating of the stator 12, and heating and softening of the varnish, or to reduce energy for heating the stator 12 to a desired temperature.

Thus, with the stator heating apparatus 10 according to the embodiment, the stator 12 can be heated from both the radially inner side and the radially outer side of the stator 12. Thus, the entire stator 12 can be heated efficiently and effectively compared to a configuration in which the stator 12 is heated from only one of the radially inner side and the radially outer side of the stator 12. Therefore, according to the embodiment, the heating time for preliminarily heating the stator 12 and the heating time for heating the varnish to cure the varnish can be shortened, which improves the productivity in manufacturing the stator 12.

In the stator heating apparatus 10 according to the embodiment, when heating the stator 12, the stator 12 is rotated with respect to the frame 36. In this case, the stator 12 is rotated with respect to the induction coil 64 which heats the stator core 16 through induction heating and the hot-air nozzles 70 which blow hot air to the coil end portions 14a and 14b. In this respect, uneven heating of the stator 12 can be suppressed to uniformly heat the entire stator 12. Thus, according to the embodiment, the stator 12 can be heated efficiently and effectively. Thus, it is possible to shorten the heating time required for preliminary heating of the stator 12, and heating and softening of the varnish, or to reduce energy for heating the stator 12 to a desired temperature.

In the embodiment described above, the radially outer grasping ring 30 corresponds to the "support," the hot air heating position corresponds to the "operation position," the movement mechanism 66 corresponds to the "first mover," the movement mechanism 76 corresponds to the "second mover." the hot-air outlet ports of the hot-air nozzles 70*a* correspond to the "first hot-air outlet port," and the hot-air outlet ports of the hot-air nozzles 70*b* correspond to the "second hot-air outlet port."

In the embodiment described above, the stator 12 as a workpiece is rotated with respect to the frame 36 in any of the preliminary heating step, the varnish dropping step, and the heating and curing step for the stator 12. However, the present disclosure is not limited thereto, and it is only necessary that the stator 12 should be rotated with respect to the frame 36 at least in the varnish dropping step.

In the embodiment described above, the dropping nozzles 52 of the varnish dropping device 50 are disposed on both the radially inner side and the radially outer side of the coil end portions 14*a* and 14*b* of the stator 12 in the varnish dropping step. However, the present disclosure is not limited thereto, and the dropping nozzles 52 may be disposed only above the radially outer side of the coil end portions 14*a* and 14*b*, or may be disposed only on the radially inner side of the coil end portions 14*a* and 14*b*.

In the embodiment described above, the dropping nozzles 52 of the varnish dropping device 50 can be moved in the up-down direction and the horizontal direction with respect to the frame 36 by the movement mechanism 54. However, the present disclosure is not limited thereto, and the dropping nozzles 52 may be movable only in the up-down direction with respect to the frame 36. In a modification in which the dropping nozzles 52 are disposed only above the radially outer side of the coil end portions 14*a* and 14*b*, the dropping nozzles 52 may be movable only in the up-down direction with respect to the frame 36, or may be fixed with respect to the frame 36 so as not to be movable in the up-down direction.

In the embodiment described above, the induction coil 64 of the first heating device 60 and the hot-air nozzles 70*b* of the second heating device 62 can be moved only in the horizontal direction with respect to the frame 36 by the movement mechanism 66. However, the present disclosure is not limited thereto, and the induction coil 64 and the hot-air nozzles 70*b* may be movable in both the horizontal direction and the up-down direction with respect to the frame 36.

In the embodiment described above, the hot-air nozzles 70*a* of the second heating device 62 can be turned and moved in the horizontal direction with respect to the frame 36 by the movement mechanism 76. However, the present disclosure is not limited thereto, and the hot-air nozzles 70*a* may be only movable in the horizontal direction with respect to the frame 36.

In the embodiment described above, both the induction coil 64 of the first heating device 60 and the hot-air nozzles 70*b* of the second heating device 62 can be moved with respect to the frame 36 by the common movement mechanism 66. However, the present disclosure is not limited thereto, and the induction coil 64 of the first heating device 60 and the hot-air nozzles 70*b* of the second heating device 62 may be movable with respect to the frame 36 independently of each other.

In the embodiment described above, the stator heating apparatus 10 is applied to the varnish impregnation apparatus 15 so that the stator heating apparatus 10 heats the stator 12 in order to impregnate the stator coil 14 with the varnish. However, the present disclosure is not limited thereto, and the stator 12 may be heated for purposes other than varnish impregnation.

In the embodiment described above, the stator 12 is supported by the radially outer grasping ring 30 while being grasped on the radially outer side of the stator 12. However, the present disclosure is not limited thereto, and the stator 12 may be supported while being grasped on the radially inner side of the stator 12.

In the embodiment described above, the present disclosure is applied to a rotary electric machine of an inner rotor type that includes the stator 12 in which the columnar cavity portion 20 is provided at the axial center and which is disposed opposite to a rotor via a predetermined air gap on the radially outer side of the rotor. However, the present disclosure is not limited thereto, and the present disclosure may also be applied to a rotary electric machine of an outer rotor type that includes a stator in which a columnar cavity portion is provided at the axial center and which is disposed opposite to a rotor via a predetermined air gap on the radially inner side of the rotor.

In the embodiment described above, further, the second heating device 62 includes the hot-air nozzles 70 which communicate with the hot air generator and which are provided with the hot-air outlet ports at the distal ends, and hot air is blown out of the hot-air outlet ports of the hot-air nozzles 70 toward the coil end portions 14*a* and 14*b* of the stator 12. However, the present disclosure is not limited thereto, and it is only necessary that the second heating device 62 should include at least a hot-air outlet port that blows out hot air. For example, the second heating device 62 may include a hole provided in a member to blow out hot air.

Figure 8:
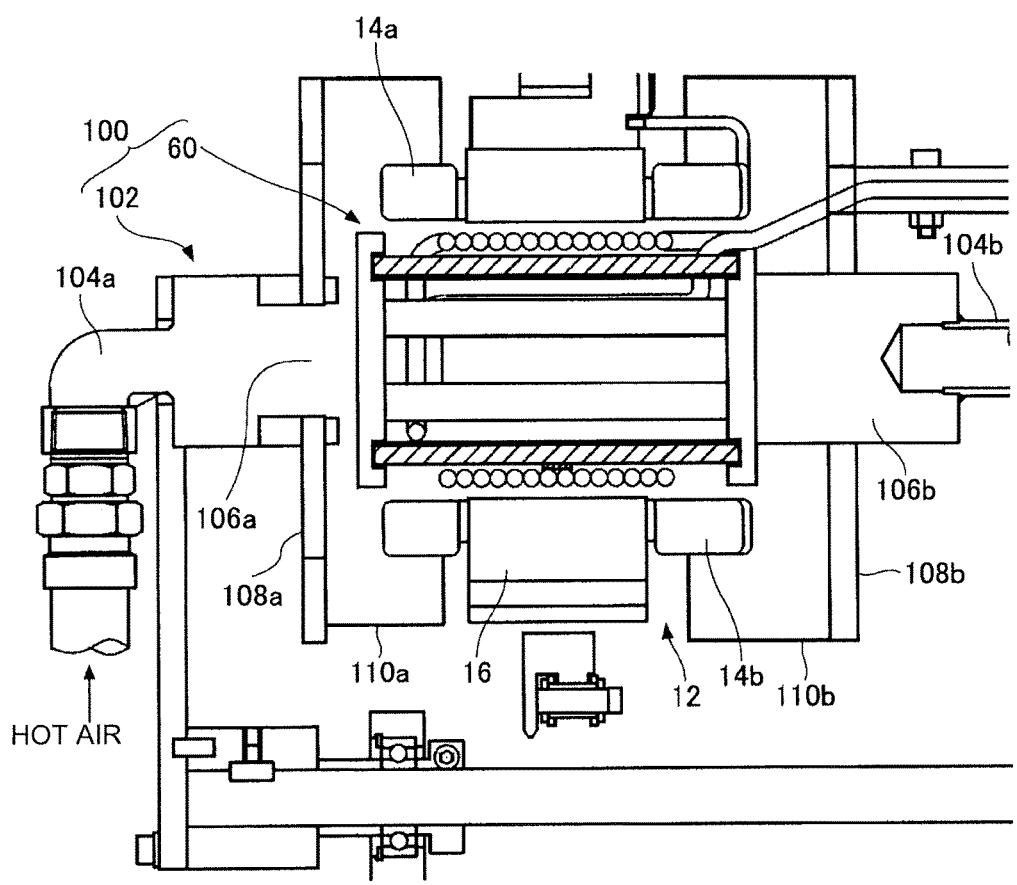
FIG. 8 is a sectional view of a stator heating apparatus according to a modification of the present disclosure.

FIG. 8 is a sectional view illustrating an essential portion of a stator heating apparatus 100 according to such a modification. In FIG. 8, constituent portions that are similar to those in FIG. 2 are given the same reference numerals to omit or simplify description. The stator heating apparatus 100 according to the modification is implemented by using a second heating device 102 that heats the stator 12 from the radially outer side and/or the axially outer side of the stator 12, in place of the second heating device 62, in the stator heating apparatus 10 according to the embodiment described above.

The second heating device 102 includes hot-air nozzles 106 that communicate with a hot-air generator (not illustrated) via pipe passages 104. The hot-air outlet ports 106 are each a hole formed at the axial center of a circular plate 108, and positioned on the axially outer side of the stator 12 and disposed in the vicinity of the coil end portions 14*a* and 14*b* when heating the stator 12. The hot-air outlet ports 106 are provided in correspondence with the coil end portions 14*a* and 14*b* at both ends, in the axial direction, of the stator 12.

Specifically, the second heating device 102 includes, as the hot-air nozzles 106, a hot-air outlet port 106*a* corresponding to the coil end portion 14*a* and used to blow hot air from a pipe passage 104*a* toward the periphery (outer surface) of the coil end portion 14*a*, and a hot-air outlet port 106*b* corresponding to the coil end portion 14*b* and used to blow hot air from a pipe passage 104*b* toward the periphery (outer surface) of the coil end portion 14*b*. The second heating device 102 heats the stator 12 using hot air by feeding hot air generated in the hot air generator from the hot-air outlet ports 106 toward the coil end portions 14*a* and 14*b* in accordance with an instruction from the controller.

A cover 110 in a cylindrical shape is attached to the circular plate 108. The cover 110 is formed so as to be able to cover the side of the outer surface of the coil end portions 14*a* and 14*b* when heating the stator 12. The cover 110 is disposed so as to cover the coil end portions 14*a* and 14*b* from the outer peripheral side when heating the stator 12, and has a function of making it difficult for the hot air from the hot-air outlet ports 106*a* and 106*b* to escape to the outside to facilitate heating of the stator 12 (in particular, the coil end portions 14*a* and 14*b*). A cover 110*a* corresponding to the coil end portion 14*a* and a cover 110*b* corresponding to the coil end portion 14*b* are provided as the cover 110. The hot air blown out of the hot-air outlet ports 106 resides in the covers 110 to heat the stator 12 (in particular, the coil end portions 14*a* and 14*b*).

Thus, also in the modification, as in the embodiment described above, the stator 12 can be heated from the radially inner side of the stator 12 using the first heating device 60, and the stator 12 can be heated from the side of the outer surface of the stator 12 using the second heating device 102. Thus, the entire stator 12 can be heated efficiently and effectively compared to a configuration in which the stator 12 is heated from only one of the radially inner side and the radially outer side of the stator 12.

In relation to the embodiment described above, the following configurations are further disclosed.

[1] A stator heating apparatus (10, 100) including: a support mechanism (30) that supports a stator (12) in which a stator coil (14) is mounted to a stator core (16) and that is driven by a rotary device (40) to rotate the stator (12); a first heating device (60) that includes an induction coil (64) inserted into a cavity portion (20) provided at an axial center of the stator core (16) of the stator (12) supported by the support mechanism (30) to be disposed to heat the stator (12) through induction heating, the first heating device (60) heating the stator (12) from a radially inner side of the stator (12); and a second heating device (62, 102) that includes a hot-air outlet port (70, 106) that blows hot air toward an outer surface of a coil end portion (14*a*, 14*b*) of the stator (12) supported by the support mechanism (30) to heat the stator (12) using the hot air, the second heating device (62, 102) heating the stator (12) from a side of the outer surface of the coil end portion (14*a*, 14*b*), in which the stator (12) is heated by the first heating device (60) and the second heating device (62, 102).

According to the configuration described in [1], the stator can be heated from both the radially inner side and the radially outer side of the stator. Thus, the entire stator in which the stator coil is mounted to the stator core can be heated efficiently and effectively compared to a configuration in which the stator is heated from only one of the radially inner side and the radially outer side of the stator.

[2] The stator heating apparatus (10, 100) described in [1], in which the stator (12) is heated from the side of the outer surface of the coil end portion (14*a*, 14*b*) by the second heating device (62, 102) while being heated from the radially inner side of the stator (12) by the first heating device (60).

According to the configuration described in [2], the stator can be heated from the radially inner side and the radially outer side at the same time. Thus, the stator can be heated efficiently and effectively.

[3] The stator heating apparatus (10, 100) according to [1] or [2], further including: a first movement mechanism (66) that advances and retracts the first heating device (60) between an inside and an outside of the cavity portion (20); and a second movement mechanism (76) that advances and retracts the second heating device (62, 102) between an operation position in the vicinity of the coil end portion (14*a*, 14*b*) and a retracted position.

According to the configuration described in [3], the first heating device can be advanced and retracted by the first movement mechanism, and the second heating device can be advanced and retracted by the second movement mechanism. Thus, the stator can be heated at the same location.

[4] The stator heating apparatus (10, 100) described in [3], in which: the second heating device (62, 102) includes, as the hot-air outlet port (70, 106), a first hot-air outlet port (70*a*, 106*a*) corresponding to the coil end portion (14*a*) which projects toward one side, in an axial direction, from the stator core (16), and a second hot-air outlet port (70*b*, 106*b*) corresponding to the coil end portion (14*b*) which projects toward the other side, in the axial direction, from the stator core (16); the first hot-air outlet port (70*a*, 106*a*) is advanced and retracted between the operation position in the vicinity of the coil end portion (14*a*) and the retracted position by the second movement mechanism (76); and the second hot-air outlet port (70*b*, 106*b*) is integrally attached to the first heating device (60), and advanced and retracted between the operation position in the vicinity of the coil end portion (14*b*) and the retracted position by the first movement mechanism (66) together with the first heating device (60).

According to the configuration described in [4], each of the coil end portions at both ends, in the axial direction, of the stator can be heated using hot air.

[5] The stator heating apparatus (10) described in any one of [1] to [4], in which: the second heating device (62) includes a hot-air nozzle (70) provided with the hot-air outlet port at a distal end, and a cover (72*a*, 72*b*) provided on an outer peripheral side of the hot-air nozzle (70) and disposed so as to cover the side of the outer surface of the coil end portion (14*a*, 14*b*) when heating the stator (12); and the hot-air nozzle (70) is configured such that the distal end of the hot-air nozzle (70) is directed toward the outer surface of the coil end portion (14*a*, 14*b*) inside the cover (72*a*, 72*b*) when heating the stator (12).

According to the configuration described in [5], hot air from the hot-air nozzle can be directly blown to the outer surface of the coil end portion of the stator, and the side of the outer surface of the coil end portion is covered by the cover, which makes it difficult for the hot air from the hot-air nozzle to escape to the outside to heat the stator using the hot air efficiently and effectively.

[6] The stator heating apparatus (10, 100) described in any one of [1] to [5], in which the support mechanism (30) supports the stator (12) while grasping a radially outer side of the stator (12).

According to the configuration described in [6], it is not necessary to dispose a support member or a support mechanism in the cavity portion on the radially inner side of the stator in supporting the stator. Thus, the first heating device can be disposed in the cavity portion, which enables the stator to be heated from the radially inner side of the stator.

[7] The stator heating apparatus (10, 100) described in any one of [1] to [6], in which the support mechanism (30) is disposed between both end surfaces, in the axial direction, on an outer peripheral side of the stator core (16).

[8] The stator heating apparatus (10, 100) described in any one of [1] to [7], in which the support mechanism (30) supports the stator (12) by clamping both ends of a fixation lug portion (24) provided on the stator core (16) to project toward a radially outer side.

[9] A stator heating method including: a first heating step of heating a stator (12), in which a stator coil (14) is mounted to a stator core (16), from a radially inner side of the stator (12) using a first heating device (60), the stator (12) being supported by a support mechanism (30) and rotated by drive of the support mechanism (30) by a rotary device (40), and the first heating device (60) including an induction coil (64) inserted into a cavity portion (20) provided at an axial center of the stator core (16) to be disposed to heat the stator (12)

through induction heating; and a second heating step of heating the stator (12) from a side of an outer surface of a coil end portion (14*a*, 14*b*) of the stator (12) using a second heating device (62, 102), the second heating device (62, 102) including a hot-air outlet port (70, 106) that blows hot air toward the outer surface of the coil end portion (14*a*, 14*b*) to heat the stator (12) using the hot air.

According to the configuration described in [9], the stator can be heated from both the radially inner side and the radially outer side of the stator. Thus, the entire stator in which the stator coil is mounted to the stator core can be heated efficiently and effectively compared to a configuration in which the stator is heated from only one of the radially inner side and the radially outer side of the stator.

[10] The stator heating method described in [9], in which the stator (12) is supported by the support mechanism (30) while being grasped on a radially outer side of the stator (12), and is rotated by drive of the support mechanism (30) by the rotary device (40).

According to the configuration described in [10], it is not necessary to dispose a support member or a support mechanism in the cavity portion on the radially inner side of the stator in supporting the stator. Thus, the first heating device can be disposed in the cavity portion, which enables the stator to be heated from the radially inner side of the stator.

The present international application is based on the priority claimed by Japanese Patent Application No. 2013-161816 filed on Aug. 2, 2013, the entire contents of which are incorporated herein.

The invention claimed is:

1. A stator heating apparatus comprising:
   a support that supports a stator in which a stator coil is mounted to a stator core and that is driven by a rotary to rotate the stator;
   a first heater that includes an induction coil inserted into a cavity portion provided at an axial center of the stator core of the stator supported by the support to be disposed to heat the stator through induction heating, the first heater heating the stator from a radially inner side of the stator; and
   a second heater that includes a hot-air outlet port that blows hot air toward an outer surface of a coil end portion of the stator supported by the support to heat the stator using the hot air, the second heater heating the stator from a side of the outer surface of the coil end portion, wherein
   the stator is heated by the first heater and the second heater, the second heater outputs heat via the hot-air outlet port, and the hot-air outlet port is adjacent to the coil end portion of the stator, the support supports the stator while grasping a radially outer side of the stator, and wherein the support is located radially outside of the stator.

2. The stator heating apparatus according to claim 1, wherein
   the stator is heated from the side of the outer surface of the coil end portion by the second heater while being heated from the radially inner side of the stator by the first heater.

3. The stator heating apparatus according to claim 2, wherein
   the second heater includes a hot-air nozzle provided with the hot-air outlet port at a distal end, and a cover provided on an outer peripheral side of the hot-air nozzle and disposed so as to cover the side of the outer surface of the coil end portion when heating the stator; and
   the hot-air nozzle is configured such that the distal end of the hot-air nozzle is directed toward the outer surface of the coil end portion inside the cover when heating the stator.

4. The stator heating apparatus according to claim 2, further comprising:
   a first mover that advances and retracts the first heater between an inside and an outside of the cavity portion; and
   a second mover that advances and retracts between an operation position in the vicinity of the coil end portion and a retracted position.

5. The stator heating apparatus according to claim 4, wherein the second heater includes, as the hot-air outlet port, a first hot-air outlet port
   corresponding to the coil end portion which projects toward one side, in an axial direction, from the stator core, and a second hot-air outlet port corresponding to the coil end portion which projects toward an other side, in the axial direction, from the stator core;
   the first hot-air outlet port is advanced and retracted between the operation position in the vicinity of the coil end portion and the retracted position by the second mover; and
   the second hot-air outlet port is integrally attached to the first heater, and advanced and retracted between the operation position in the vicinity of the coil end portion and the retracted position by the first mover together with the first heater.

6. The stator heating apparatus according to claim 4, wherein
   the second heater includes a hot-air nozzle provided with the hot-air outlet port at a distal end, and a cover provided on an outer peripheral side of the hot-air nozzle and disposed so as to cover the side of the outer surface of the coil end portion when heating the stator; and
   the hot-air nozzle is configured such that the distal end of the hot-air nozzle is directed toward the outer surface of the coil end portion inside the cover when heating the stator.

7. The stator heating apparatus according to claim 4, wherein
   the support is disposed between both end surfaces, in the axial direction, on an outer peripheral side of the stator core.

8. The stator heating apparatus according to claim 4, wherein
   the support supports the stator by clamping both ends of a fixation lug portion provided on the stator core to project toward the radially outer side.

9. The stator heating apparatus according to claim 1, further comprising:
   a first mover that advances and retracts the first heater between an inside and an outside of the cavity portion; and
   a second mover that advances and retracts between an operation position in the vicinity of the coil end portion and a retracted position.

10. The stator heating apparatus according to claim 9, wherein
    the second heater includes, as the hot-air outlet port, a first hot-air outlet port corresponding to the coil end portion which projects toward one side, in an axial direction, from the stator core, and a second hot-air outlet port corresponding to the coil end portion which projects toward an other side, in the axial direction, from the stator core;

the first hot-air outlet port is advanced and retracted between the operation position in the vicinity of the coil end portion and the retracted position by the second mover; and the second hot-air outlet port is integrally attached to the first heater, and advanced and retracted between the operation position in the vicinity of the coil end portion and the retracted position by the first mover together with the first heater.

11. The stator heating apparatus according to claim 1, wherein the second heater includes a hot-air nozzle provided with the hot-air outlet port at a distal end, and a cover provided on an outer peripheral side of the hot-air nozzle and disposed so as to cover the side of the outer surface of the coil end portion when heating the stator; and the hot-air nozzle is configured such that the distal end of the hot-air nozzle is directed toward the outer surface of the coil end portion inside the cover when heating the stator.

12. The stator heating apparatus according to claim 1, wherein the support is disposed between both end surfaces, in the axial direction, on an outer peripheral side of the stator core.

13. The stator heating apparatus according to claim 1, wherein the support supports the stator by clamping both ends of a fixation lug portion provided on the stator core to project toward the radially outer side.

14. The stator heating apparatus according to claim 2, wherein the support is disposed between both end surfaces, in the axial direction, on an outer peripheral side of the stator core.

15. The stator heating apparatus according to claim 2, wherein the support supports the stator by clamping both ends of a fixation lug portion provided on the stator core to project toward the radially outer side.

16. A stator heating method comprising:

heating a stator, in which a stator coil is mounted to a stator core, from a radially inner side of the stator using a first heater, the stator being supported by a support and rotated by drive of the support by a rotary, and the first heater including an induction coil inserted into a cavity portion provided at an axial center of the stator core to be disposed to heat the stator through induction heating; and heating the stator from a side of an outer surface of a coil end portion of the stator using a second heater, the second heater including a hot-air outlet port that blows hot air toward the outer surface of the coil end portion to heat the stator using the hot air, wherein the second heater outputs heat via the hot-air outlet port, and the hot-air outlet port is adjacent to the coil end portion of the stator, and wherein the stator is supported by the support while being grasped on a radially outer side of the stator, the stator is rotated by drive of the support by the rotary, and wherein the support is located radially outside of the stator.

* * * * *